United States Patent
Witchger et al.

(10) Patent No.: US 6,604,832 B2
(45) Date of Patent: Aug. 12, 2003

(54) THIN FILM MIRROR BOND TO PLASTIC BEAD

(75) Inventors: William J. Witchger, Indianapolis, IN (US); Bruce J. Donner, Pittsboro, IN (US)

(73) Assignee: Mir-Tec, LLC, Indianapolis, IN (US)

( * ) Notice: Subject to any disclaimer, the term of this patent is extended or adjusted under 35 U.S.C. 154(b) by 0 days.

(21) Appl. No.: 09/862,837

(22) Filed: May 22, 2001

(65) Prior Publication Data

US 2002/0176182 A1 Nov. 28, 2002

(51) Int. Cl.[7] .................................................. G02B 5/08
(52) U.S. Cl. ........................ 359/847; 359/883; 248/467
(58) Field of Search .................................. 359/846, 847, 359/883, 884; 248/467

(56) References Cited

U.S. PATENT DOCUMENTS

| | | | |
|---|---|---|---|
| 3,733,116 A | 5/1973 | Hutchinson | |
| 3,757,479 A | 9/1973 | Martinez | ..................... 52/222 |
| 3,792,917 A | 2/1974 | Martinez | |
| 3,877,139 A | 4/1975 | Martinez | .................... 29/469.5 |
| 3,880,500 A | 4/1975 | Kojabashian | |
| 3,912,380 A * | 10/1975 | Klein | ......................... 359/848 |
| 3,936,159 A | 2/1976 | Pavenick | |
| 3,973,834 A | 8/1976 | Penn et al. | |
| 4,198,452 A * | 4/1980 | Olcott et al. | ................ 359/883 |
| 4,229,077 A * | 10/1980 | Schwab | ....................... 359/846 |
| 4,454,703 A | 6/1984 | Sitzler et al. | .................... 52/788 |
| 4,483,323 A | 11/1984 | Murphy | ..................... 126/438 |
| 4,550,986 A * | 11/1985 | Leach | ..................... 156/308.2 |
| 4,666,263 A | 5/1987 | Petcavich | |
| 5,014,174 A | 5/1991 | Won et al. | ................... 362/309 |
| 5,247,395 A | 9/1993 | Martinez | ..................... 359/883 |
| 5,428,483 A * | 6/1995 | Sato et al. | .................. 359/838 |
| 5,483,386 A * | 1/1996 | Carson | ........................ 359/879 |
| 5,552,006 A | 9/1996 | Soliday et al. | .............. 156/160 |
| 5,930,058 A | 7/1999 | Witchger | .................... 359/847 |
| 6,065,843 A * | 5/2000 | Martinez, Sr. | .............. 359/847 |

* cited by examiner

Primary Examiner—Mark A. Robinson
(74) Attorney, Agent, or Firm—Woodard, Emhardt, Moriarty, McNett & Henry LLP

(57) ABSTRACT

A multi-sided metal frame having a top surface is provided with a plastic bead on the surface, extending lengthwise of each side of the frame and spaced slightly inboard from the outer perimeter of the frame. A hot-melt adhesive is provided atop the bead. A mirror film is applied to the bead and secured in place by the adhesive. The film portion within the area defined by the bead is tight and planar in a plane spaced from the frame and retained in that condition by the cured adhesive.

The method can be implemented by forming a metal strip into an L-shaped cross section, applying the plastic bead along the top outside face, and then cutting and bending the strip as needed and connecting ends to form the frame. Then the top of the bead is finished to lie in a plane. Then the adhesive is applied. The frame is held in a horizontal attitude with the face up while the mirror film is held tightly in a planar condition and then brought down upon the adhesive atop the plastic bead and leveled by a platen engaging the film so that the film is disposed in a plane spaced from a plane containing the top surface of the frame. The film is thus held against the adhesive until the adhesive cures quickly to permanently affix the film in place relative to the frame without requiring additional adhesive or a long curing time. The plastic bead impedes heat transfer between the adhesive and the frame and which would otherwise interfere with curing.

1 Claim, 9 Drawing Sheets

THIN FILM MIRROR BOND TO PLASTIC BEAD

BACKGROUND OF THE INVENTION

1. Field of the Invention

This invention relates generally to thin film mirrors, and more particularly to a method of securing the mirror film to the frame, and the resulting product.

2. Description of the Prior Art

Much effort has been directed to providing mirrors useful in projection television equipment. Examples of patented mirror technology for various uses, some of which is for television equipment, can be found in my U.S. Pat. No. 5,930,058, and the references cited therein. The content of that patent, to any extend needed, is incorporated herein by reference. With the advent of high-definition television (HD-TV), mirror improvements are desired. The present invention is addressed to that goal.

SUMMARY OF THE INVENTION

While mirrors made according to the present invention will be normally used with the reflecting face in a generally vertical attitude, the terminology used herein describes the mirror assembly as though lying in a horizontal plane.

According to one embodiment of the present invention, a multi-sided metal frame having a top surface is provided with a thermal insulating bead on the top surface, extending lengthwise of each side of the frame and spaced slightly inboard from the outer perimeter of the frame. A high-strength, fast-curing adhesive is provided atop the bead. A mirror film is applied to the bead and secured in place by the adhesive. The film portion within the area defined by the bead is tight and planar and retained in that condition by the cured adhesive. The thermal insulating means inhibits heat transmission between the adhesive and the frame and which would otherwise interfere with the desired curing time for the adhesive.

The method can be implemented by forming an elongate metal strip to give it a structural cross-sectional shape having a top face, applying the insulating bead along the top face, and then cutting and bending the strip as needed and connecting ends to form the frame. Then a frame back-board is installed and secured in the frame. Then the top of the bead is finished to be planar in a plane. Then the frame is held in a horizontal attitude with the face up and the adhesive is applied. Then mirror film is held tightly in a planar condition and then brought down upon the adhesive atop the bead. Then a platen descends, engaging the film portion above and in the layout pattern of the bead so that the film is disposed in a plane spaced from a plane containing the top surface of the frame. The film is thus held against the adhesive until the adhesive cures quickly to permanently fix the film in place relative to the frame without requiring additional adhesive or a long curing time.

DESCRIPTION OF THE ILLUSTRATED EMBODIMENT

Figure 1:
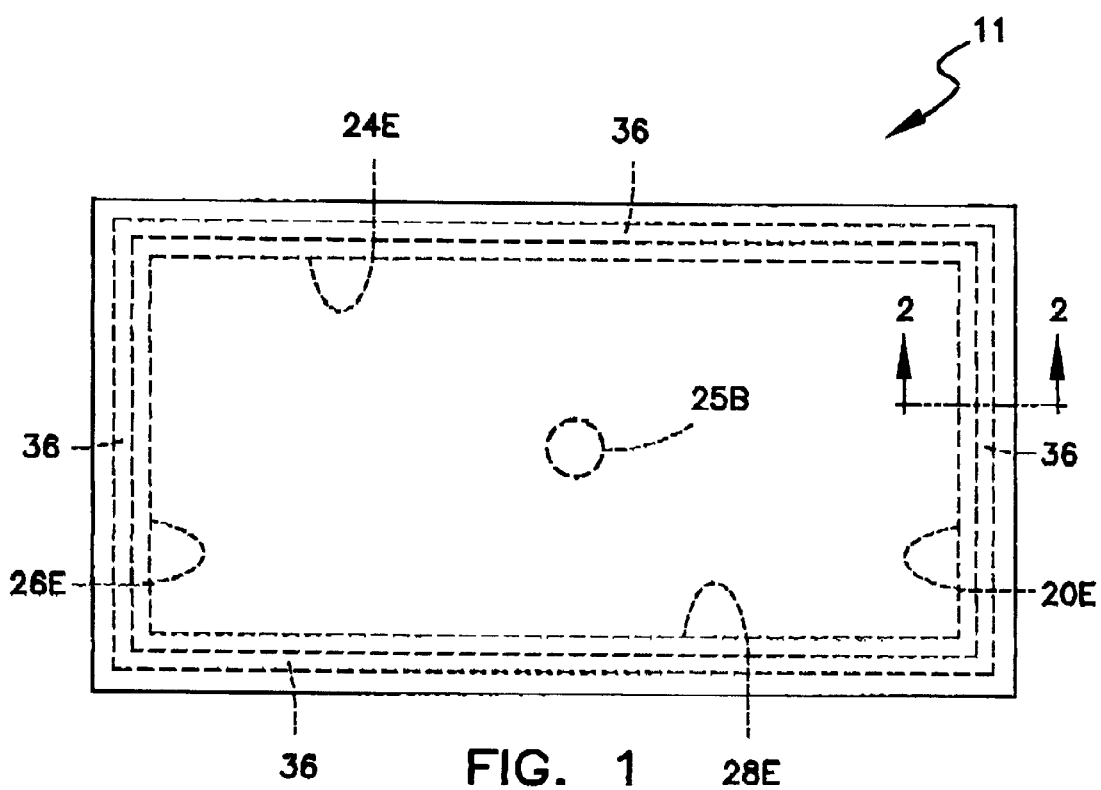
FIG. 1 is a top plan view of a completed thin film mirror according to one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
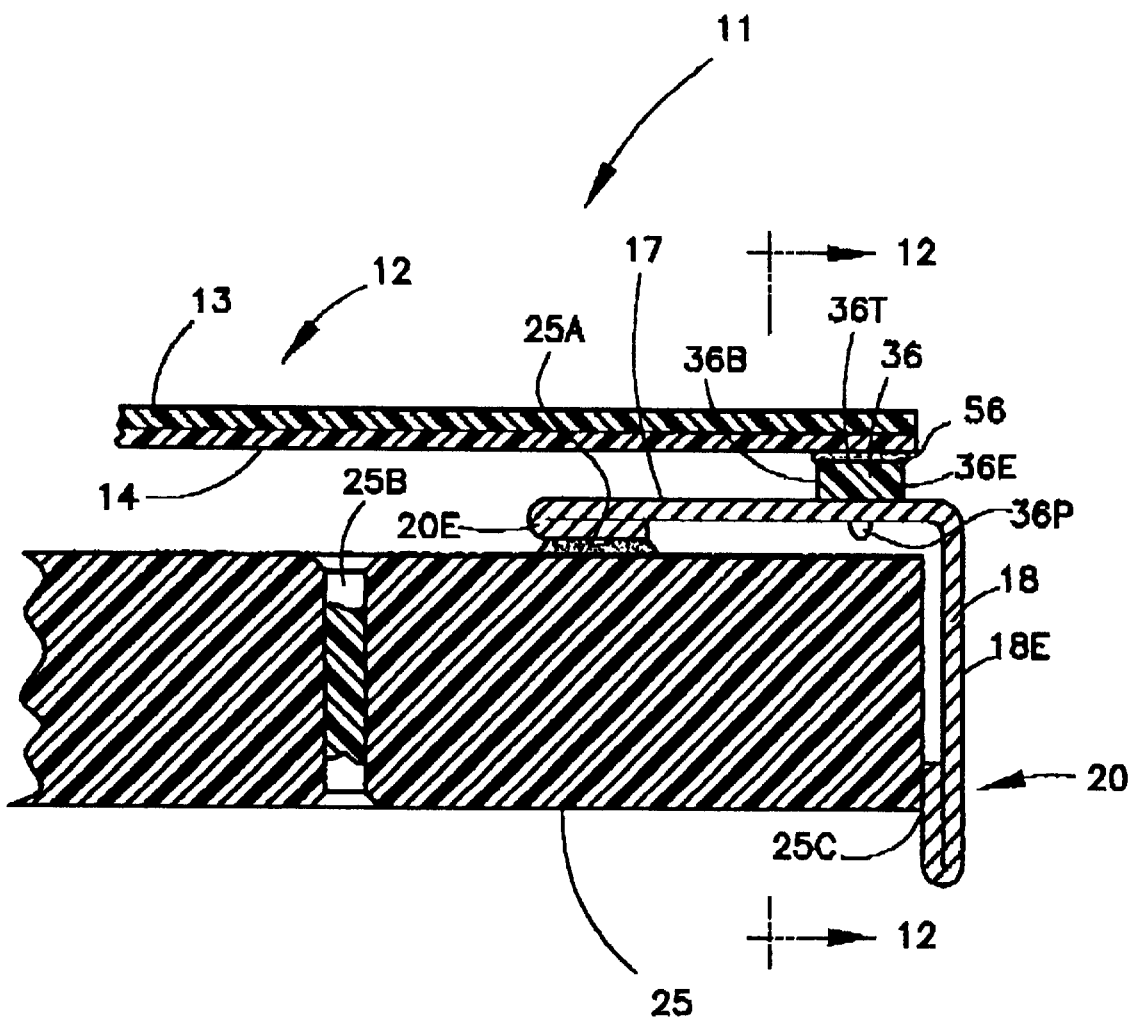
FIG. 2 is a cross-sectional view taken at line 2—2 in FIG. 1 and viewed in the direction of the arrows.

Referring now to the drawings in detail, and particularly FIGS. 1 and 2, the rectangular mirror assembly 11 has a front face 12, the outer surface of which is a thin plastic film 13 with a reflective metal deposit 14 on the back face thereof. The film may be polyester film 0.025 millimeter thick, such as manufactured by DuPont of Wilmington, Del. under the Stock No. Mylar-D. The metal coating may be vacuum-deposited silver or aluminum, (2 to 2.2 density units, for example), depending upon reflectivity and cost considerations.

Figure 7:
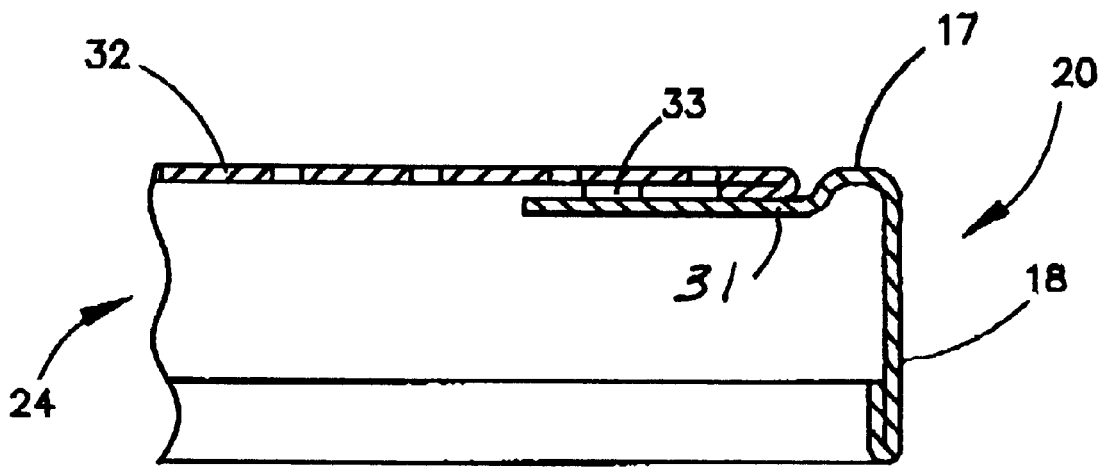
FIG. 7 is a section taken at line 7—7 in FIG. 3 and viewed in the direction of the arrows.

A rectangular frame 16 (FIG. 3) is formed from a single strip of metal formed into a right-angle cross-section having what will be referred to herein as the top flange 17 and side flange 18, each of which is folded upon itself to provide a hemmed edge as shown. The top flange of the strip is notched at longitudinally spaced locations to enable bending it into discrete frame members to form the frame. For example, the strip 19 (FIG. 4), which has an L-shaped cross-section, has the top flange notched at 21 and 22 to enable folding the end member having the top flange 17 and side flange 18 in the direction of arrow 23 about the junction in the side flange and relative to the member 24. Similarly, member 26 is foldable in a counterclockwise direction of arrow 27 and a member 28 (not shown in FIG. 4), is folded to form the fourth frame member of the frame shown in FIG. 3. One end of each member has an offset stamped in it as at 31 in FIGS. 4 and 7 to enable the top flange of the next adjacent member to over-lie the end portion during the folding step, as best shown in FIG. 7. The rest of the top flange of the adjacent member, as at the top of flange 32 of the adjacent member 24, is co-planar with the top of flange 17 of the member 20. Once the strip 19 is bent into the four member frame, the overlapping portions at the corners can be spot welded as at 33 and 34, for example, using one or more spot welds at each corner to make the frame as rigid as desired.

Figure 3:
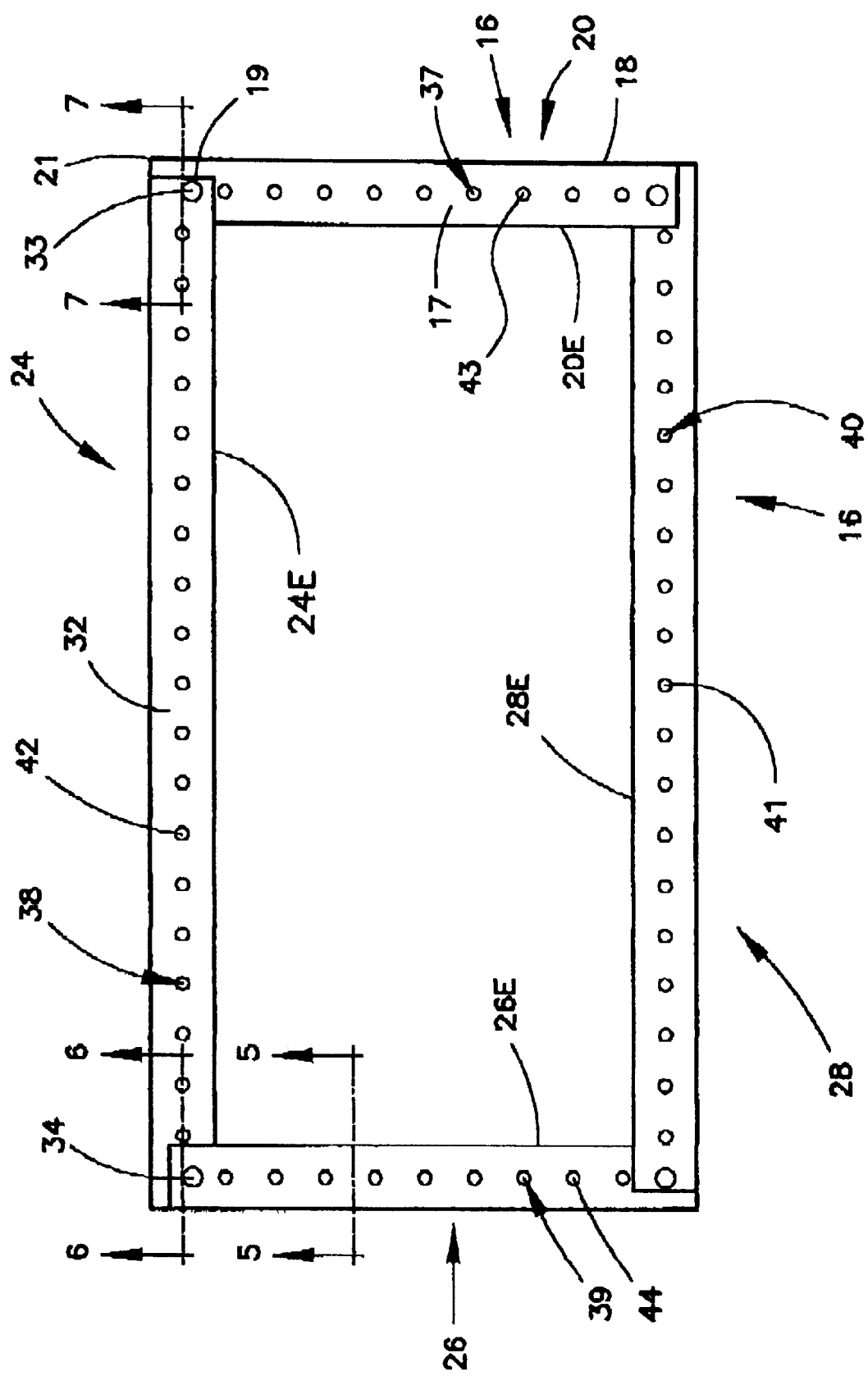
FIG. 3 is a top view of the mirror frame prior to application of the mirror and backing.
Figure 4:
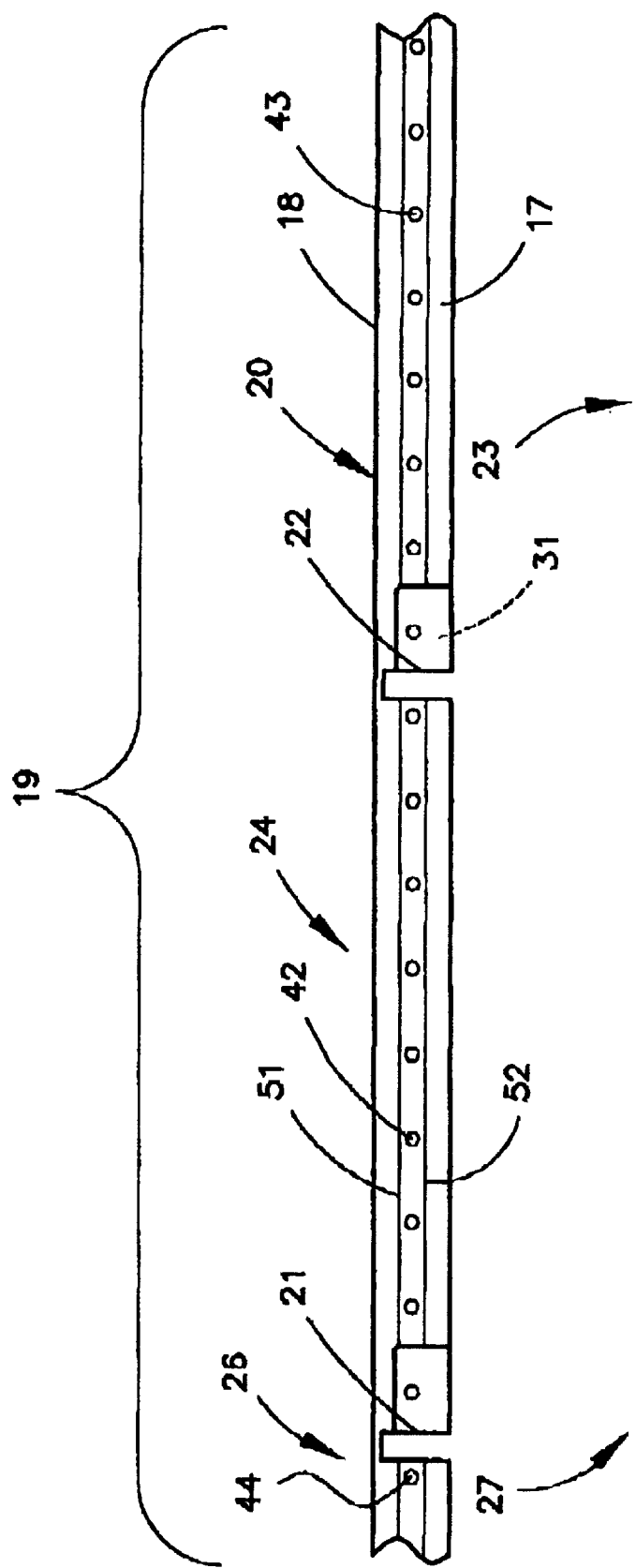
FIG. 4 is a top view of the metal strip used for the frame and prior to cutting, notching and bending into the frame of FIG. 3.
Figure 5:
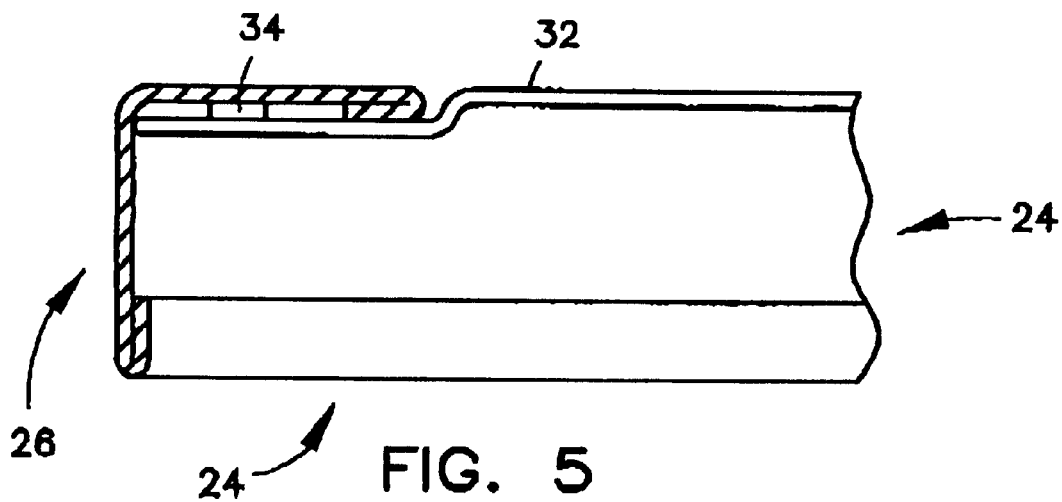
FIG. 5 is a section taken at line 5—5 in FIG. 3 and viewed in the direction of the arrows.
Figure 6:
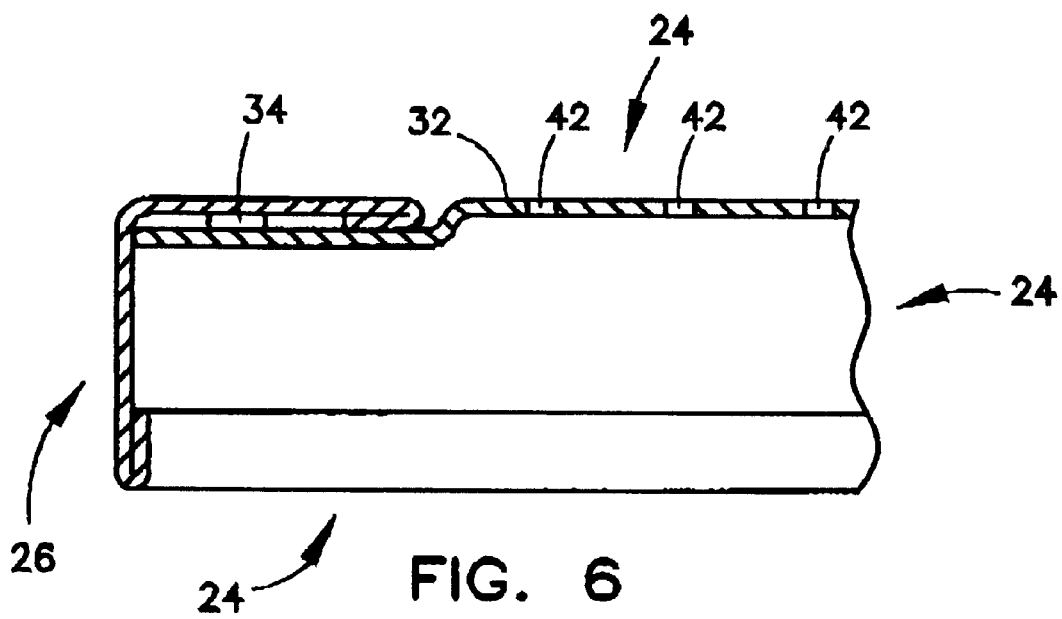
FIG. 6 is a section taken at line 6—6 in FIG. 3 and viewed in the direction of the arrows.

A protective board 25 is provided inside the frame and secured to the reverse turn flange at the inner edge of each of the side members by adhesive at 25A. The adhesive may be a two-part epoxy product applied to either the frame or the board and then the frame pushed down onto the board. The board is made for a snug fit in the side flanges of the frame as at 25C. A filtered aperture 25B may be provided in the board as shown in FIG. 2 or 3 of my aforementioned patent, and FIG. 13 herein. So it is seen that the board is secured in the frame in much the same manner as in that patent.

Figure 8:
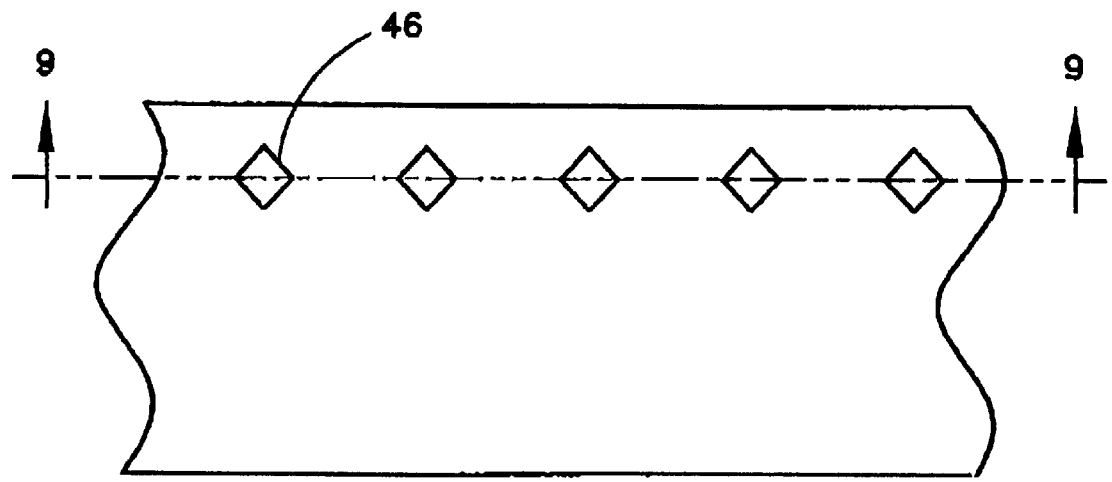
FIG. 8 is a top view of a fragment of a frame member showing an alternate form of insulator strip anchor in the form of pyramids.
Figure 9:
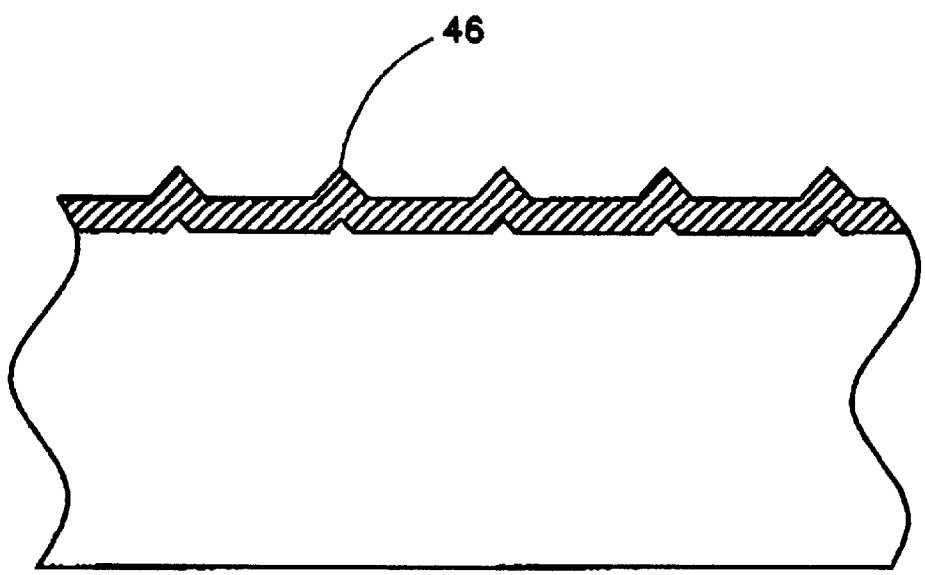
FIG. 9 is a section taken at line 9—9 in FIG. 8 and viewed in the direction of the arrows.
Figure 10:
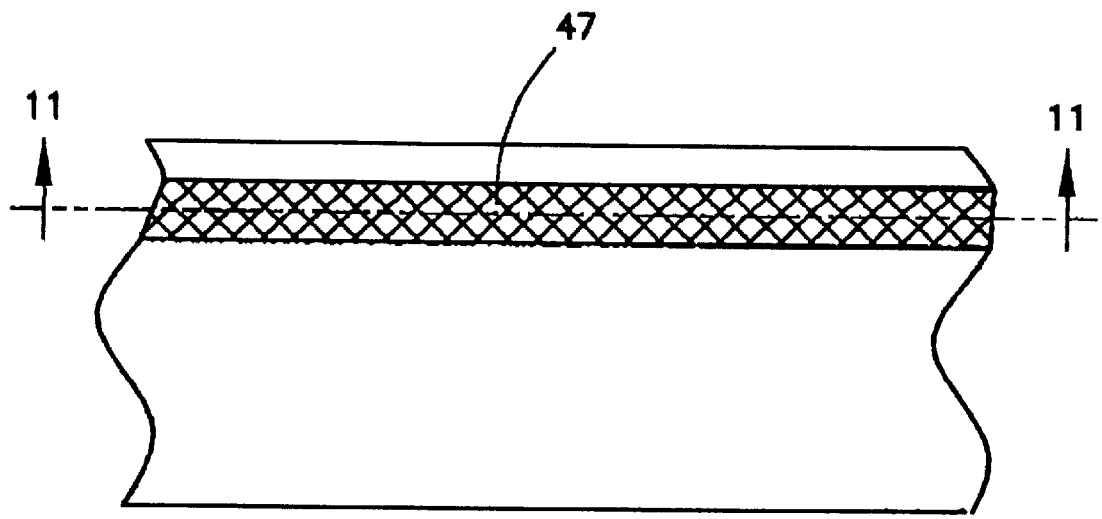
FIG. 10 is a top view of a fragment of a frame member employing knurling as a form of anchor for the insulator strip.
Figure 11:
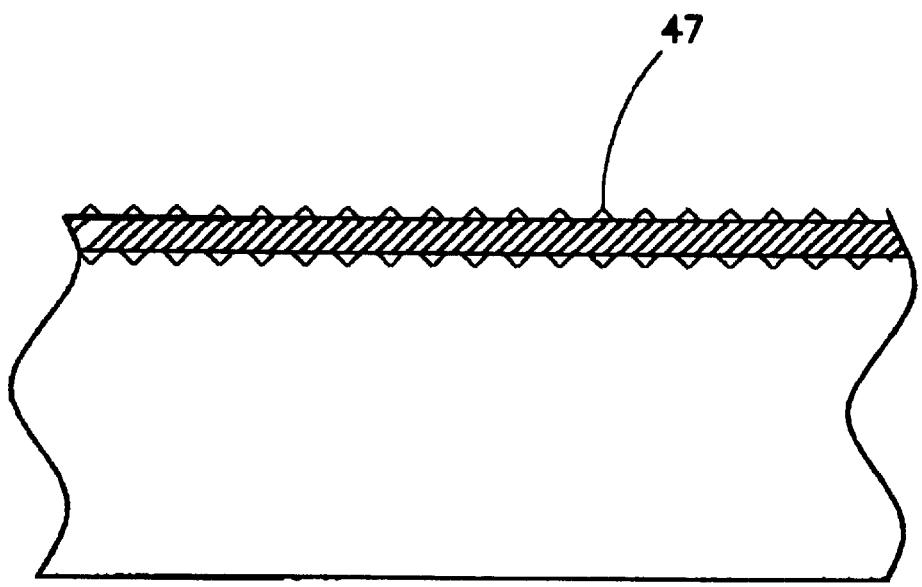
FIG. 11 is a section taken at line 11—11 in FIG. 10 and viewed in the direction of the arrows.

Referring now to FIGS. 1 and 2, a feature of the present invention is a bead of thermal insulating material provided on the top surface of the top flange of the metal frame. As an example, a 0.100 inch high bead 36 of plastic material is extruded in a rectangular cross-section 0.125 inch wide onto the metal strip FIG. 4 before notching and bending. The outside edge 36E of the bead is set inboard from the outside wall 18E of the flange a distance of 0.060 to 0.125 inch. If desired, a heat-activated adhesive may be applied to the frame strip metal top surface before extruding the plastic onto the surface, followed by induction heating upstream of the extruder outlet as the metal strip runs through the extruder to set the adhesive and securely anchor the bead to the frame. For additional anchorage, if desired, irregularities may be formed in the top of the frame. As an example, abutments of some sort may be employed at spaced locations along lines parallel to the length of the frame members, and inset from the outer perimeter of the down-turned flanges by 0.125 to 0.188 inch or so, as shown at 37, 38, 39, and 40 in FIG. 3. Holes through the top flange as at 41 in row 40, 42 in row 38 and 43 in row 37 and 44 in row 39, may be provided. An alternative anchorage system is shown in FIGS. 8 and 9 where anchors are provided in the form of pyramid-shaped abutments 46 which may be pressed into or out of the top flange. Another possibility shown in FIGS. 10 and 11 is knurling as shown at 47.

Figure 12:
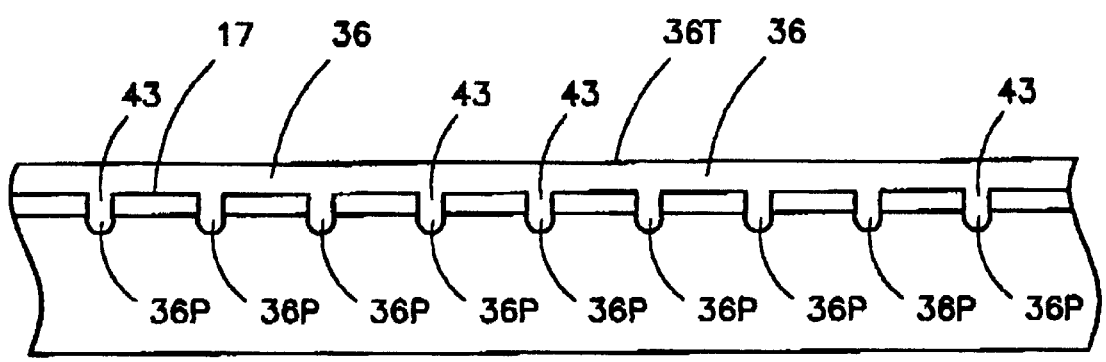
FIG. 12 is a longitudinal section of the embodiment of FIG. 2 as at 12—12 in FIG. 2 (but omitting the backing board and mirror film itself) and showing the extrusion of the plastic through the anchor holes in the metal frame.

In the manufacture of one example of the apparatus, a metal strip 19, at least as long as necessary to provide all of the side members necessary to form the frame of desired size and shape, is formed with the hems on the edges and the included right angle to make a rail of L-shaped cross section. Then it is pierced or embossed or knurled to provide the provided anchorage for the insulating bead to be applied. The lines 51 and 52 in FIG. 4 designate the sides of the path along which the bead 36 would be applied and within which the anchorage features are provided. In one example shown in FIG. 12, where the top flange 17 is provided with apertures in it, and where the bead 36 has been extruded from a stationary head closely associated with the top surface of flange 17 as the strip is passed longitudinally through the head, some of the plastic material may be extruded into or through the holes such as 43 at 36P. The bead 36 is generated on the strip before the notching operation on the top flange as described above. Then, after the metal strip has been formed into the frame as in FIG. 3, and the backing board adhesive 25A cured to fix the board in the frame, the top surface 36T of the bead might have become slightly irregular. Therefore, it is finished as by machining, grinding, or passing under a sanding drum so that surface 36T is flat and defines a single flat plane.

Figure 13:
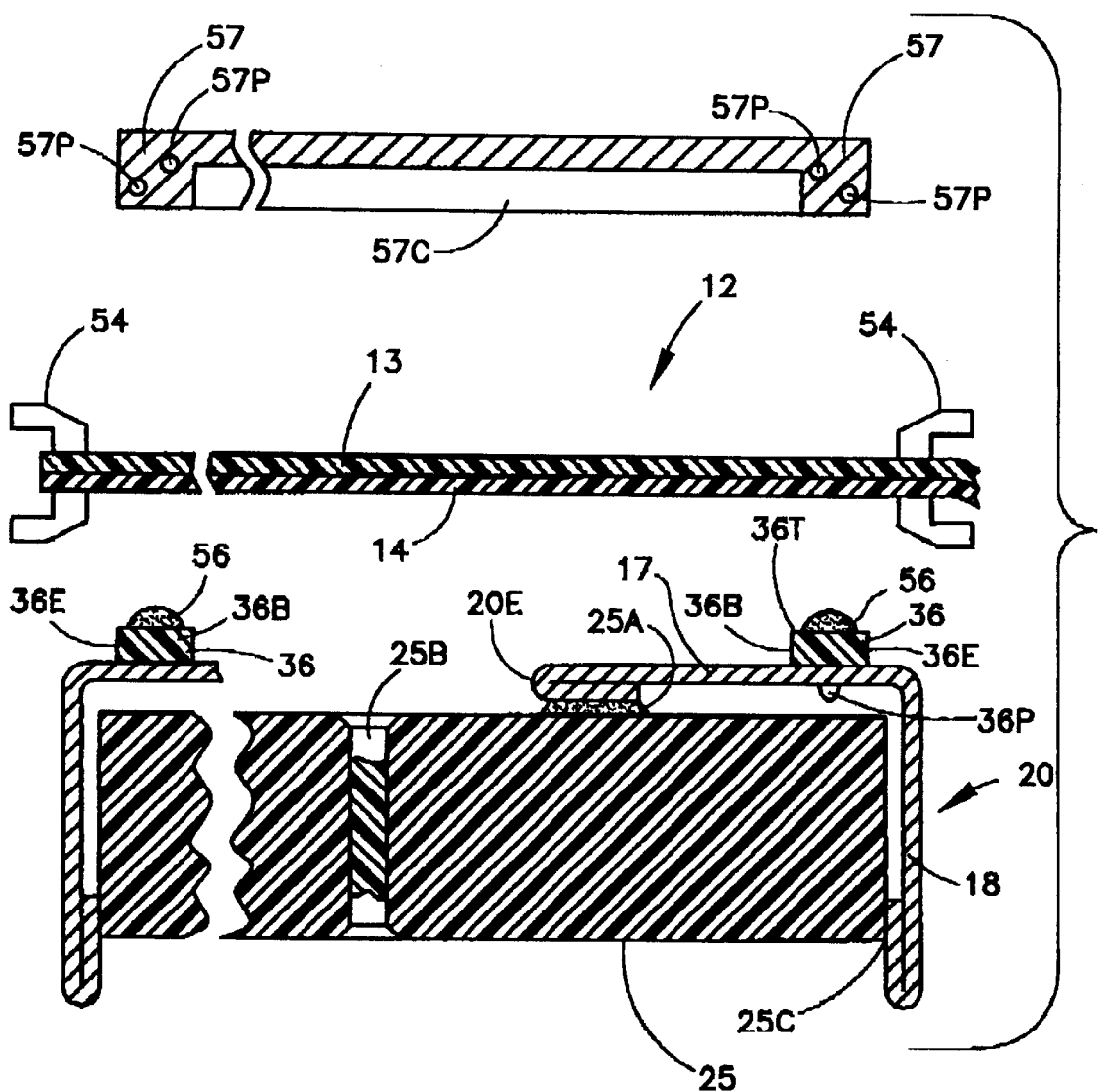
FIG. 13 is a schematic view of the organization of components during manufacture.

Then the frame and board assembly are placed in a fixture where an X-Y robot applies adhesive 56 to the top surface of the insulating bead 36 entirely around the frame. Then the assembly is placed under a mirror film stretcher shown schematically and fragmentarily in FIG. 13 where the film 12 is shown held in grippers 54 at four sides and stretched over the space within inner edges 20E, 24E, 26E, and 28E of the frame top flanges. Then the grippers move the film 12 toward the frame and thereby the film is brought into contact with the adhesive 56. Then a platen 57 is brought into contact with the film 12 in the area immediately above the adhesive 56, mashing the adhesive 56 virtually flat, from a bead of 0.080 inches thick, for example, to 0.010 inches. Then, the adhesive cures while the components are held in place by the grippers and platen. Then the film is cut along the sides of the frame, the grippers are released from the film edges, and the grippers and platen are moved away. Any remaining film outboard from the outer edge 36E of the insulating bead is cut away around the entire perimeter of the frame. As shown in FIG. 13, it is preferable that the platen have a recess 57C in the underside so as to contact the film only at the location atop the adhesive 56, and not in the area inboard of the bead inner perimetrical edge 36B. Since the adhesive 56 is a rapidly curing adhesive of high strength, the mirror will be retained tightly within the boundaries defined by the plastic bead 36 and adhesive interface 56.

After curing, the mirror assembly can be removed from the assembly fixturing and, if desired, may be heat shrunk by any suitable means to improve its flatness. So it is seen that the entire mirror film is flat and lies in a plane spaced the thickness of the finished bead from the plane of the top flange faces of the frame members. The invention is applicable as well with mirrors having frames with more side members or with one less side or of a circular or irregular shape.

As examples, the glue at 25A securing the board to the frame may be a 24 hour setting epoxy such as produced by Thermoset, Lord Chemical Products of Indianapolis, Ind. under Product No. 300/66. The metal frame may be made of 22 gauge galvanized steel stock. As an example of the board, it may be ½ inch thick closed cell, rigid urethane foam as manufactured by CelloTex, Stock No. Tuf-R. A silk screen stretcher for the film may be such as, for example, the Accu-Stretch device by Tuf Products, International. A contrast tape as described in my above-mentioned patent, may be applied to the outward marginal portion of the reflective film, if desired, as in my aforementioned patent.

The plastic used for the bead 36 will be selected to be as compatible as possible with the material finish and cleanliness of the top face of each of the top flanges of the frame members. At present, styrenes seem to have the most potential for practical use. Others may prove to be suitable as well. Also, if desired to enhance anchorage of the plastic bead to the frame rail, the frame can be heated by induction heaters to enhance the anchorage, and then cooled. Several different types of adhesive may be used under the bead 36 (if needed, between the plastic extrusion and the metal of the frame top surface or face, to get the plastic to stick well to the metal), or atop the bead at 56. Examples are as follows: 3M TS230, a thermo-set adhesive; 3M 3738PG, a hot melt adhesive; Locktite 3412, a two-part epoxy adhesive; Locktite 409, a cyanoacrylate "Super Glue". For the mechanical anchor surfaces, examples are: for FIG. 3, $\frac{1}{16}$ inch diameter holes on 1 inch centers; for FIG. 8, a raised area formed from the bottom of the top flange and in the form of a pyramid $\frac{1}{16}$ inch square at the base and $\frac{1}{32}$ inch tall; or for FIG. 10, a knurled track in an area similar to the base desired for the plastic insulator bead.

Where the adhesive 56 needs addition of heat or withdrawal of heat, for rapid curing, the platen can be supplied with hot or cold fluid in internal passageways 57P to provide the desired heating or cooling function through the film to the adhesive 56. Thus, in contrast to some prior practices requiring overnight curing of the adhesive between the mirror film and the support for it, curing with the practice of the present invention can be secured within one minute.

While the foregoing description has emphasized the use of a plastic insulating bead at 36, it is conceivable that an insulating strip with pressure sensitive adhesive may be employed. In that event, of course, it would be necessary that it be thick enough to provide the desired space between the film and the top surface of the metal frame top flange at all locations inboard of the adhesive strip so as to be sure that mirror flatness is within specifications throughout the projected area within the inner perimeter of the adhesive insulating strip.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A mirror assembly comprising:

a multi-sided polygonal frame of elongate metal members, each member having a top face extending lengthwise of the member, with said top faces of said members being co-planar in a first horizontal plane;

thermal insulating means on said faces and having a flat top surface in a second plane;

an adhesive on said insulating means and having a flat top surface in a third plane spaced from said first plane;

a mirror material secured to said adhesive and lying in said third plane;

said top faces of said elongate metal members having a plurality of anchors therein for said insulating means;

said insulating means including a bead of plastic extending longitudinally on said faces and engaging said anchors; and said bead having an inner perimeter defining and framing clear space between said third plane and said first plane and spanned by said mirror material totally covering said clear space.

* * * * *